(12) United States Patent
Bawamia et al.

(10) Patent No.: US 10,690,877 B2
(45) Date of Patent: Jun. 23, 2020

(54) OPTICAL DEVICE COMPRISING A MICRO-OPTICAL SYSTEM AND A RETAINER, AND METHOD FOR PRODUCING AN OPTICAL DEVICE

(71) Applicant: FORSCHUNGSVERBUND BERLIN E.V., Berlin (DE)

(72) Inventors: Ahmad Ibrahim Bawamia, Berlin (DE); Christian Kuerbis, Berlin (DE); Andreas Wicht, Berlin (DE)

(73) Assignee: FORSCHUNGSVERBUND BERLIN E.V., Berlin (DE)

( * ) Notice: Subject to any disclaimer, the term of this patent is extended or adjusted under 35 U.S.C. 154(b) by 0 days.

(21) Appl. No.: 15/500,643

(22) PCT Filed: Jul. 24, 2015

(86) PCT No.: PCT/EP2015/067018
§ 371 (c)(1),
(2) Date: Jan. 31, 2017

(87) PCT Pub. No.: WO2016/016132
PCT Pub. Date: Feb. 4, 2016

(65) Prior Publication Data
US 2017/0235088 A1    Aug. 17, 2017

(30) Foreign Application Priority Data
Jul. 31, 2014   (DE) .................. 10 2014 215 105

(51) Int. Cl.
*G01B 7/02*     (2006.01)
*G02B 7/02*     (2006.01)
(Continued)

(52) U.S. Cl.
CPC .............. *G02B 7/022* (2013.01); *B29C 65/48* (2013.01); *G02B 7/025* (2013.01); *B29L 2011/00* (2013.01)

(58) Field of Classification Search
CPC ........................... G02B 6/4244; G02B 7/022
(Continued)

(56) References Cited

U.S. PATENT DOCUMENTS 5,257,145 A  * 10/1993  Kanazawa ............... G02B 7/02
                                                        359/811
5,467,228 A     11/1995  Lin
(Continued)

FOREIGN PATENT DOCUMENTS

CA      2313357 A1     1/2001
DE      4034014 A1     5/1991
(Continued)

OTHER PUBLICATIONS

International Search Report from PCT/EP2015/067018 dated Oct. 29, 2015.

*Primary Examiner* — Mahidere S Sahle
(74) *Attorney, Agent, or Firm* — Fox Rothschild LLP

(57) ABSTRACT

The present invention relates to an to an optical device comprising a micro-optical system and a retainer, and to a method for producing an optical device. In the case of the device according to the invention, the micro-optical system (10) is fastened in such a way that the micro-optical system is oriented in relation to a surface (50) of the retainer (60). The device is characterized in that the retainer (60) has a round, tapered recess (40) and the micro-optical system (10) is fastened on a spherical cap (20) and the spherical cap (20) is fastened to the retainer (60), wherein the spherical cap (20) at least partially protrudes into the recess (40) and lies against a partial surface (30) of the recess (40) or an edge (41) in the recess (40), wherein the spherical cap (20) is
(Continued)

fastened to the retainer (60) in the recess (40), but is not fastened where the spherical cap lies in contact. Because the spherical cap lies in contact, shrinking of a fasting means cannot cause a shift or rotation of the spherical cap and thus cannot cause a misadjustment.

12 Claims, 3 Drawing Sheets

(51) Int. Cl.
*B29C 65/48* (2006.01)
*B29L 11/00* (2006.01)

(58) Field of Classification Search
USPC .................................................. 359/811
See application file for complete search history.

(56) References Cited

U.S. PATENT DOCUMENTS

| | | | |
|---|---|---|---|
| 5,781,351 A | * | 7/1998 | Murakami ............ G02B 7/025 359/808 |
| 7,003,211 B2 | | 2/2006 | Flanders et al. |
| 7,672,067 B2 | | 3/2010 | Kawanami |
| 2004/0212903 A1 | | 10/2004 | Nogami |

FOREIGN PATENT DOCUMENTS

| | | |
|---|---|---|
| DE | 19533426 A1 | 5/1996 |
| DE | 19751352 A1 | 5/1999 |
| DE | 19755356 A1 | 6/1999 |
| DE | 10347450 A1 | 5/2005 |
| DE | 102009035192 A1 | 8/2010 |
| EP | 0519219 A2 | 12/1992 |
| EP | 1345059 A1 | 9/2003 |
| EP | 1607781 A2 | 12/2005 |
| JP | S6168734 A | 4/1986 |
| JP | 63020114 U | 2/1988 |
| JP | H05021325 U | 3/1993 |
| JP | H05101429 A | 4/1993 |
| JP | H06289264 A | 10/1994 |
| JP | H07311325 A | 11/1995 |
| JP | H08152547 A | 6/1996 |
| JP | 08329508 A | 12/1996 |
| JP | 2006154201 A | 6/2006 |

* cited by examiner

OPTICAL DEVICE COMPRISING A MICRO-OPTICAL SYSTEM AND A RETAINER, AND METHOD FOR PRODUCING AN OPTICAL DEVICE

CROSS-REFERENCE TO RELATED APPLICATIONS

This application is a § 371 national stage entry of International Application No. PCT/EP2015/067018, filed Jul. 24, 2015, which claims priority to and the benefit of German Application No. 10 2014 215 105.8, filed Jul. 31, 2014, both of which are hereby incorporated herein by reference in their entireties.

The present invention relates to an optical device comprising a micro-optical system and a retainer, and to a method for producing an optical device.

In order to achieve the microintegration of a micro-optical system, it is essential for the micro-optical system to be fastened on a retainer in such a way that the optical axis of the micro-optical system is adjusted.

U.S. Pat. No. 7,003,211 B2 describes an adjustment with the aid of LIGA technology, which is based on a combination of deep photolithography, electroplating, and micro-molding.

DE 195 33 426 A1 produces adjustable structures by means of O-SMD (optical surface-mounted devices) tripod technology.

In order to fasten micro-optical systems, soldering with laser reflow soldering technology is proposed in DE 197 51 352 A1.

DE 103 47 450 describes a ceramic substrate having integrated mechanical structures.

Fuse-bonding with a notch or groove structure is disclosed in EP 1 345 059 A1.

JP H08 15 25 47 proposes a slot needle retainer in a notch.

The inventors have identified that the adjustment of the optical axis of a micro-optical system can be further simplified and improved.

Therefore, an optical device having a micro-optical system and a retainer according to Claim 1, and a method for producing an optical device according to Claim 6 are presented according to the invention.

The present invention relates to an optical device comprising a micro-optical system and a retainer, and to a method for producing an optical device.

In the case of the device according to the invention, the micro-optical system is fastened in such a way that the micro-optical system is oriented in relation to a surface of the retainer. The device is characterized in that the retainer has a round, tapered recess and the micro-optical system is fastened on a spherical cap and the spherical cap is fastened to the retainer, wherein the spherical cap at least partially protrudes into the recess and lies against a partial surface of the recess or an edge in the recess, wherein the spherical cap is fastened to the retainer in the recess, but not where the spherical cap lies in contact.

Because the spherical cap is not fastened where the spherical cap lies in contact, shrinking of a fastening means cannot cause a shift or rotation of the spherical cap relative to the retainer and thus cannot cause a misadjustment.

In advantageous embodiments of the device, the spherical cap lies along a support line either against the surface of a part of the recess which is in the form of a conical portion and is closer to the retainer surface or against an edge of a step in the recess, wherein a fastening encloses the support line.

The resulting gap around the support line in this embodiment can be configured to be particularly narrow, so that little fastening material will suffice.

The fastening can touch the support line.

In particular, the spherical cap can be fastened by means of a bonding agent.

The method according to the invention is based on a retainer which has a round, tapered recess, and comprises the following steps:

Mounting of a base surface of the micro-optical system on a planar side of a spherical cap, Mounting of the spherical cap in the recess, so that the spherical cap at least partially protrudes into the recess and lies against an edge in the recess or against a surface of the recess, Orienting of the micro-optical system, and Fastening of the micro-optical system on the spherical cap and fastening of the spherical cap to the retainer where the spherical cap does not lie in contact.

In advantageous embodiments of the device, the spherical cap lies along a support line either against the surface of a part of the recess which is in the form of a conical portion and is closer to the retainer surface or against an edge of a step in the recess, wherein a fastening encloses the support line.

The fastening can be effected by means of a bonding agent.

The orienting of the micro-optical system can comprise shifting of the micro-optical system on the planar side and/or rotating of the spherical cap.

Additional advantageous embodiments are specified in the subordinate claims and/or are set out in the embodiment examples which are described below with reference to the figures, wherein:

Figure 1:
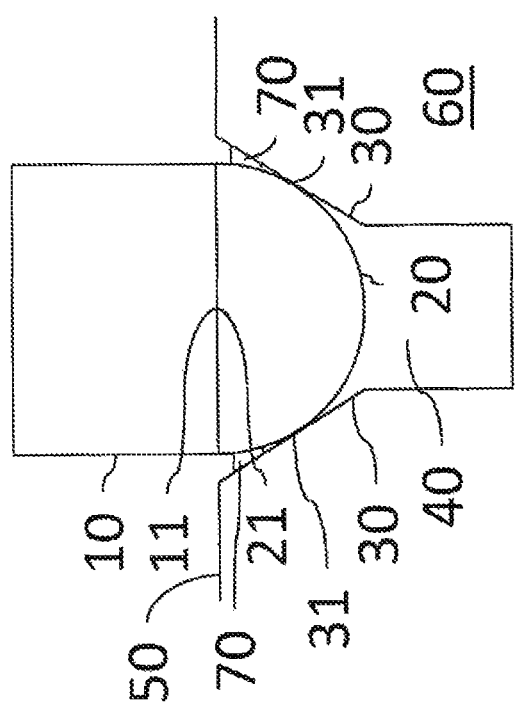
FIG. 1 shows a vertical section of a first embodiment example.

FIG. 1 shows a vertical section of a first embodiment example. A micro-optical system 10 is connected by means of a planar side 11 to a corresponding planar side 21 of a spherical cap 20. The spherical cap 20 lies on a support line 31 against a partial surface 30 of a recess 40 (hole), which is circular in horizontal section, in the surface 50, said partial surface being inclined with respect to a surface 50 of a retainer 60. The partial surface 30 therefore forms a chamfer of the recess 40.

In the first embodiment example, a part of the recess 40 closer to the surface 50 of the retainer 60 is therefore in the form of a conical portion and a remaining portion is in the form of a circular cylinder.

The spherical cap 20 is fastened to the partial surface 30 and therefore to the retainer 50 with the aid of adhesive 70. In the first embodiment example, the spherical cap 20 protrudes completely into the recess 40.

In the embodiment example, the adhesive 70 completely encloses the support line 31. However, the invention is neither limited to a fastening by means of adhesive nor to a complete enclosing of the support line with fastening means.

The spherical cap can be inserted with its spherical side into the recess in such a way that it wholly or partially protrudes into the recess. The planar side 21 of the spherical cap 20 makes it possible to mount a base surface 11 of the micro-optical system 10 onto said spherical cap and, by means of shifting, to orient the micro-optical system 10 in a translational manner with respect to the retainer 60. After fastening the micro-optical system 10 on the spherical cap 20, the micro-optical system 10 can be oriented in a rotational manner with respect to the retainer 60. Since rotations about small angles substantially act as a tangential translation, re-orientation in a translational manner is possible. It is also possible for the micro-optical system 10 to be simply oriented by being shifted on the spherical cap 20, simply by rotations about small angles following fastening on the spherical cap 20 or, by means of both processes, in a translational manner with respect to the retainer 60.

It is also possible to fasten the spherical cap to the retainer first of all in such a way that the planar side 21 of the spherical cap 20 possesses a specified orientation to the retainer and then orienting and fastening the micro-optical system on the spherical cap 20 in a translational manner in the plane of the planar side 21 and in a rotational manner about the surface normal of the planar side 21.

By rotating the spherical cap 20 about larger angles, the fastened micro-optical system 10 can be oriented in a rotational manner with respect to the retainer 60. Rotations about three axes of rotation which are vertical to one another and shifts along two shift axes which are vertical to one another are thereby possible.

Finally, the oriented micro-optical system 10 is fastened on the spherical cap 20 and the spherical cap 20 is fastened on the retainer, wherein the adhesive 70 fastens the spherical cap 20 to the partial surface 30 where the spherical cap 20 does not lie in contact.

Since the spherical cap 20 is not fastened where the spherical cap lies in contact, this guarantees that the fastening cannot cause any change in the orientation.

The fastening can, for example, be effected with liquid adhesive 70. Said liquid adhesive can be applied locally at a location in the region (adhesive joint) which opens towards the surface 50 between the spherical cap 20 and the partial surface 30. Due to capillary forces the liquid adhesive 70 is then uniformly distributed in the entire adhesive joint. The adhesive 70 finally encloses the entire spherical cap uniformly and in a circular form. However, the liquid adhesive 70 does not penetrate between the spherical cap 20 and the partial surface 30 along the support line 31. Changes in volume of the adhesive 70, which can arise as a result of curing, then act uniformly on the micro-optical system, so that no angular misalignment occurs.

Figure 2:
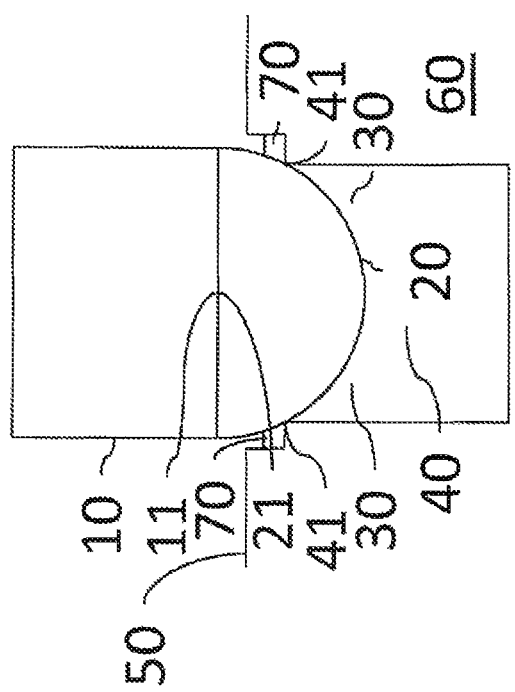
FIG. 2 shows a vertical section of a second embodiment example.

FIG. 2 shows a vertical section of a second embodiment example. Again, a micro-optical system 10 having a flat side 11 is connected to a corresponding planar side 21 of a spherical cap 20. The spherical cap 20 lies against an edge 41 of a step of a recess 40, which is circular in a horizontal section, in a surface 50 of a retainer 60. The spherical cap 20 is fastened with the aid of adhesive 70 on the step and thus to the retainer 50. In the second embodiment example, the spherical cap 20 only partially protrudes into the recess 40.

Again, the spherical cap 20 is not fastened where the spherical cap lies in contact. It is therefore also guaranteed in the second embodiment example that no change in the alignment is possible due to the fastening following the alignment.

The recess of the second embodiment example is easier to produce.

Figure 3:
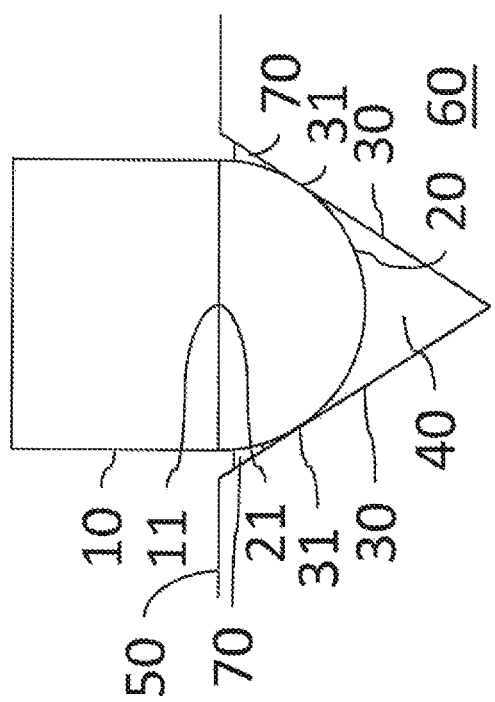
FIG. 3 shows a vertical section of a third embodiment example.

The third embodiment example, as shown in FIG. 3, merely differs from the first embodiment example in that the recess 40 is completely designed as a conical bore.

The recesses are shown in the embodiment examples in such a way that they do not completely penetrate the retainer. They are therefore shown as blind holes. In accordance with the invention, however, recesses (through holes) which completely penetrate the retainer are also possible.

The invention claimed is:

1. An optical device comprising a micro-optical system and a retainer, wherein the micro-optical system is fastened in such a way that the micro-optical system is oriented in relation to a surface of the retainer, characterized in that the retainer has a round, tapered recess and the micro-optical system is fastened on a spherical dome and the spherical dome having a spherical surface is fastened to the retainer, wherein the spherical dome at least partially protrudes into the recess and lies against a partial surface of the recess or an edge in the recess, wherein the spherical dome is fastened to the retainer by a fastening element provided inside the recess, but is not fastened where the spherical dome lies in contact, wherein the spherical surface directly contacts the partial surface of the recess or the edge in the recess, wherein the fastening element is only on a single side of said direct surface contact in a gap between the spherical dome and a second partial surface of the recess, said gap being located on said single side together with the micro-optical system.

2. The device according to claim 1, wherein the surface forms a part of the recess which is in the form of a conical portion and is closer to the retainer surface and the spherical dome lies against the surface along a support line, wherein a fastening encloses the support line.

3. The device according to claim 1, wherein the edge forms a stage in the recess, wherein a fastening is arranged on the step.

4. The device according to claim 2, wherein the fastening touches the support line.

5. A method for producing an optical device comprising a micro-optical system and a retainer, wherein the retainer has a round, tapered recess, comprising the following steps:
   mounting of a base surface of the micro-optical system on a planar side of a spherical dome having a spherical surface,
   mounting of the spherical dome in the recess, so that the spherical dome at least partially protrudes into the recess and lies against an edge in the recess or against a surface of the recess, wherein the spherical surface directly contacts the partial surface of the recess or the edge in the recess,
   orienting of the micro-optical system, and
   fastening of the micro-optical system on the spherical dome and providing a fastening element within the recess for fastening of the spherical dome to the retainer in the recess, but not where the spherical dome lies in contact, wherein the fastening element is only on a single side of said direct surface contact in a gap between the spherical dome and a second partial surface of the recess, said gap being located on said single side together with the micro-optical system.

6. The method according to claim 5, wherein the surface forms a part of the recess which is in the form of a conical portion and is closer to the retainer surface, and the spherical dome lies against the surface along a support line, wherein a fastening encloses the support line.

7. The method according to claim 5, wherein the edge forms a stage in the recess, wherein a fastening is arranged on the step.

8. The method according to claim 5 wherein the orienting of the micro-optical system comprises: shifting of the micro-optical system on the planar side and/or rotating of the spherical dome.

9. The device according to claim 3, wherein the fastening touches the support line.

10. The device according to claim 1, wherein a contact area of the spherical surface and the recess of the retainer forms a circle.

11. The device according to claim 1, wherein the fastening element is completely formed within the recess of the retainer.

12. An optical device comprising a micro-optical system and a retainer, wherein the micro-optical system is fastened in such a way that the micro-optical system is oriented in relation to a surface of the retainer, characterized in that the retainer has a round, tapered recess and the micro-optical system is fastened on a spherical dome and the spherical dome is fastened to the retainer, wherein the spherical dome has a circular planar side and the micro-optical system has a planar side,
- wherein the circular planar side of the spherical dome and the planar side of the micro-optical system are in contact with each other,
- wherein the spherical dome at least partially protrudes into the recess and lies against a partial surface of the recess or an edge in the recess, wherein the spherical dome is fastened to the retainer by a fastening element provided in the recess, but is not fastened where the spherical dome lies in contact,
- wherein the spherical surface directly contacts the partial surface of the recess or the edge in the recess, wherein the fastening element is only on a single side of said direct surface contact in a gap between the spherical dome and a second partial surface of the recess, said gap being located on said single side together with the micro-optical system.

* * * * *